US00RE33940E

United States Patent [19]

Matsuo

[11] E Patent Number: Re. 33,940

[45] Reissued Date of Patent: May 26, 1992

[54] DUPLEX COPYING APPARATUS

[75] Inventor: Hirokazu Matsuo, Toyokawa, Japan

[73] Assignee: Minolta Camera Kabushiki Kaisha, Osaka, Japan

[21] Appl. No.: 284,136

[22] Filed: Dec. 14, 1988

Related U.S. Patent Documents

Reissue of:

[64] Patent No.: 4,721,381
Issued: Jan. 26, 1988
Appl. No.: 941,086
Filed: Dec. 12, 1986

U.S. Applications:

[63] Continuation of Ser. No. 708,255, Mar. 5, 1985, abandoned.

[30] Foreign Application Priority Data

Mar. 6, 1984 [JP] Japan ..... 59-43278
Apr. 27, 1984 [JP] Japan ..... 59-87129

[51] Int. Cl.[5] ..... G03G 15/00

[52] U.S. Cl. ..... 355/311; 355/243; 355/24; 355/55

[58] Field of Search ..... 355/243, 311, 23, 24, 355/26, 55-57, 60, 66

[56] References Cited

U.S. PATENT DOCUMENTS 3,615,129 10/1971 Drawe et al. .
3,630,607 12/1971 Korn et al. .
4,277,165 7/1981 Wada et al. .
4,341,460 7/1982 Kohyama .
4,455,081 6/1984 Yoshimura et al. .
4,505,579 3/1985 Furaichi ..... 355/55
4,575,227 3/1986 Ito et al. ..... 355/56

*Primary Examiner*—R. L. Moses
*Attorney, Agent, or Firm*—Price, Gess & Ubell

[57] ABSTRACT

There is disclosed a copying apparatus having a duplex copying capability for copying an image of a first document on the front face of a copy paper and an image of a second document on the rear face of the copy paper. This apparatus is controlled so as to inhibit the copying operation in case that the image of the second document can not be contained within the frame of the rear face of the copy paper. Having the magnification varying capability, this apparatus is controlled so as to set an optimum magnification computed from either a size of the first document or the copy paper and a size of the second document.

37 Claims, 7 Drawing Sheets

DUPLEX COPYING APPARATUS

Matter enclosed in heavy brackets [ ] appears in the original patent but forms no part of this reissue specification; matter printed in italics indicates the additions made by reissue.

This is a continuation application of Ser. No. 708,255, filed Mar. 5, 1985 (now aband).

BACKGROUND OF THE INVENTION

1. Field of the Invention

The present invention relates to a copying apparatus capable of duplex copying, and more particularly to the control of such a copying apparatus for copying two documents different in size or direction on the front face (face) and rear face (back) of copy paper.

2. Prior Art

There have heretofore been proposed many duplex copying apparatus capable of copying images on both surfaces of copy paper to reduce the number of copied sheets, for example, as described in U.S. Pat. No. 3,615,129. The conventional duplex copying apparatus operate to form a copied image of a first original document on the face of copy paper and a copied image of a second original document on the back of the copy paper.

In general, however, the sizes of the first and second documents are not necessarily the same. Where the second document is larger in size than the first document and the first and second documents are copied on the face and back of the copy paper at the same magnification, a copied image of the second document is not properly contained within the frame of the back of the copy paper. When the user of the copying apparatus manually replaces documents, it is possible to select suitable copying magnifications. However, the user often tends to forget to change copying magnifications, and it is troublesome to change such magnifications. Where the copying apparatus is combined with a document feeder which automatically positions documents on a transparent plate of glass serving as a document support, the conventional copying apparatus fails to allow copying magnifications to be changed for each document to be copied.

Likewise, in the even that the first and second documents are positioned on the transparent glass plate in different directions, a copying failure may result in which a copied image of the second document does not fall within the size of the back of the copy paper.

SUMMARY OF THE INVENTION

Accordingly, it is a primary object of the present invention to provide a duplex copying apparatus which will cause no copying failure when first and second documents to be copied are different in size or direction.

Another object of the present invention is to provide a duplex copying apparatus which, when an image of a second document is to be copied on the back of copy paper that carries an image of a first document on the face thereof, allows the image of the second document to be copied if the image is contained in a frame of the copy paper, and produces an indication if the image is not properly contained in the frame of the copy paper.

The above objects can be achieved by a copying apparatus having a duplex copying capability for copying an image of a first document on the face of copy paper and an image of a second document on the back of the copy paper, the duplex copying apparatus comprising means for storing the size or direction of the copy paper or the first document, means for detecting the size or direction of the second document, discriminating means for ascertaining if the image of the second document can be contained within the frame of the back of the copy paper by comparing the stored size or direction with the detected size or direction, and control means for allowing the image of the second document to be copied on the back of the copy paper if the image of the second document is determined by the discriminating means to be containable within the frame of the back of the copy paper, or indicating a copying error without copying if the image of the second document cannot be contained within the frame of the back of the copy paper.

BRIEF DESCRIPTION OF THE DRAWINGS

These and other objects or features of the present invention will become apparent from the following description of a preferred embodiment thereof taken in conjunction with the accompanying drawings, in which.

DESCRIPTION OF THE PREFERRED EMBODIMENT

Figure 1:
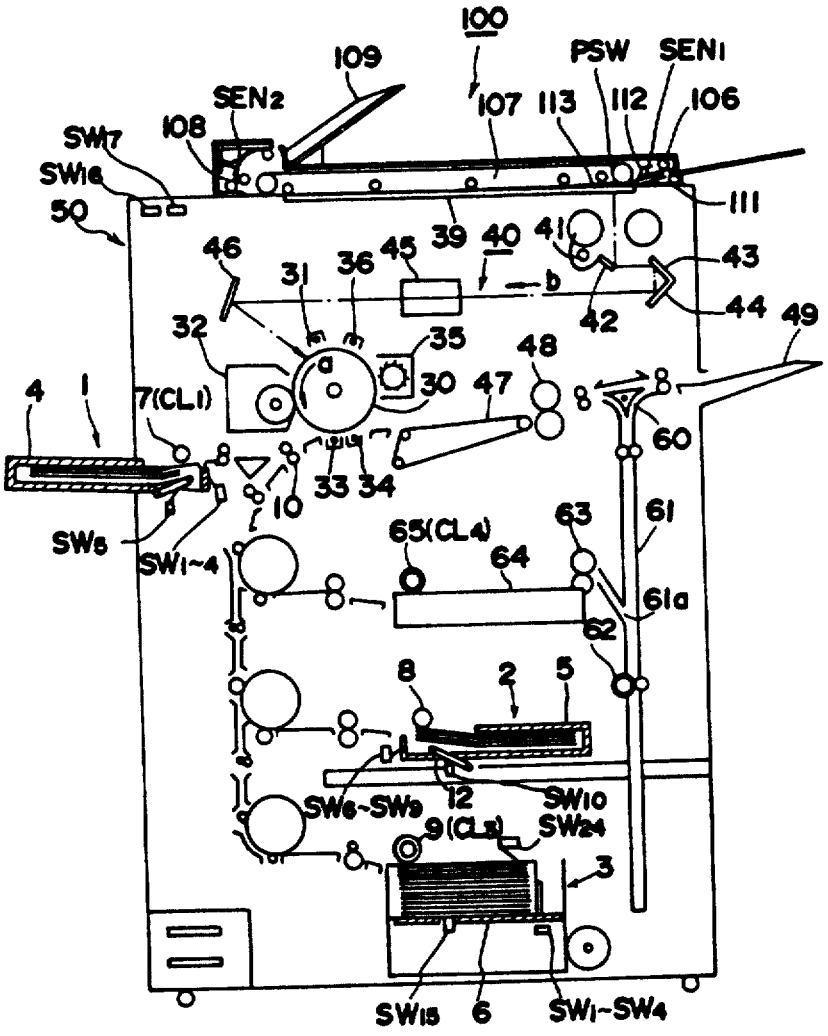
FIG. 1 is a cross-sectional view of the copying device and document feeder in a duplex copying apparatus according to the present invention.

FIG. 1 schematically shows a duplex copying apparatus according to the present invention, the duplex copying apparatus having a copying device 50 and a document feeder (hereinafter referred to a "DF") 100. The copying device 50 includes various imaging means of a known construction in an upper portion thereof and three paper feeders for storing copy papers of different sizes in a lower portion thereof.

The imaging means surrounds a photosensitive drum 30 rotatable in the direction of the arrow a and include a charger 31, a developing unit 32, an image transfer charger 33, a paper separation charger 34, a cleaning unit 35, and an eraser lamp 36. An imaging optical system 40 is disposed below a transparent document support or platen 39 of glass for scanning a document image. In the imaging optical system 40, light emitted from a light source 41 is reflected from a document on the transparent document support 39 to expose the surface of the photosensitive drum 30 in the pattern of a slit through a first mirror 42, a second mirror 43, a third mirror 44, a projecting lens 45, and a fourth mirror 46. The light source and the first mirror 42 move at a speed of V/m (V is the peripheral speed of the photosensitive drum 30 and m is the copying magnification) in the direction of the arrow b. The second and third mirrors 43, 44 move at a speed of V/2m in the direction of the arrow b. The projecting lens 45 is moved by known means along its optical axis when copying magnifications are changed.

The paper feeders include an upper paper feeder 1, a middle paper feeder 2, and a lower paper feeder 3. The upper and middle paper feeders 1, 2 comprise detachable paper cassettes 4, 5, respectively, for automatically feeding sheets of copy paper. The lower paper feeder 3 includes a copy paper support 6 which is progressively elevated for automatically feeding sheets of copy paper. In the paper feeders 1, 2, 3, the uppermost sheets of copy paper is fed out by means of paper feeder rollers 7, 8, 9, respectively. The paper feeders 1, 2, 3 are coupled to an image transfer unit by a paper feed path defined by various guide rollers and guide plates. The transfer unit is preceded by a pair of timing rollers 10 for synchronizing the leading edge of a sheet of copy paper selectively fed from the paper feeders 1, 2, 3 with the leading edge of an image carried on the photosensitive drum 30.

The copy paper on which an image has been transferred is conveyed by a conveyor belt 47 having a suction means (not shown) for attracting the copy paper on the surface of the conveyor belt 40 which it conveys the copy paper to an image fixing unit 48.

Disposed downstream of the fixing unit 48 in the direction of movement of the copy paper is a switching means 60 for selectively guiding the fixed copy paper to a tray 49 or a re-feeding mechanism.

The re-feeding mechanism has a reversing path 61 extending vertically downwardly from the switching means 60, a reversible roller 62, a reception roller 63, and intermediate tray 64, and a re-feeding roller 65. The copy paper with an image copied on one surface thereof is fed into the reversing path 61 upon normal rotation of the reversible roller 62. When the trailing edge of the copy paper reaches a position beneath a branch 61a, the reversible roller 62 stops its normal rotation and then starts being reversed to feed the copy paper through the reception roller 63 into the intermediate tray 64. The copy paper is then fed again into the paper feed path by the re-feeding roller 65 which is driven in response to a re-feeding signal.

The copying device 50 of the foregoing construction has a simplex or normal copying cycle in which a copied image is formed on one surface of copy paper and a duplex copying cycle in which copied images are formed on both surfaces of copy paper. The normal and duplex copying cycles can be selected by a mode switching key SW17. The copying operation in each cycle is started by a print key SW16 or by setting a document to be copied in the DF 100.

In the normal copying cycle, a toner image is formed on the photosensitive drum 30 and transferred onto a sheet of copy paper fed from a selected one of the paper feeders 1, 2, 3. The copy paper with the toner image thereon is then passed through the fixing unit 48 and discharged onto the tray 49.

In the duplex copying cycle, a toner image formed on the photosensitive drum 30 is transferred onto a sheet of copy paper fed from a selected on of the paper feeders 1, 2, 3, and fixed to the copy paper with heat in the fixing unit 48. The copy paper with the toner image fixed thereto is then introduced by the switching means 60 into the reversing path 61, from which the copy paper is fed by the reversible roller 62 and the reception roller 63 onto the intermediate tray 64. At this time, the image has been copied on the front face (face) of the copy paper. Then, a document to be copied on the rear face (back) of the copy paper is placed on the document support 39, and a copying operation to copy an image on the back of the copy paper is started. More specifically, when the document is set in place and a copy starting signal is issued, a re-feeding clutch CL4 is engaged to drive the re-feeding roller 65 to re-feed the copy paper from the intermediate tray 64, and a toner image is transferred to the back of the copy paper. The toner image is fixed with heat to the back of the copy paper, which is then discharged onto the tray 49.

Therefore, the copying device 50 has three modes, i.e., a normal copying made, a face copying mode (one of duplex copying mode), and a back copying mode (another one of duplex copying mode). The copying device 50 has an automatic magnification setting capability (hereinafter referred to as "AMS") for automatically computing and setting an optimum copying magnification in cooperation with the DF 100 at the time a document size and a copy paper size are specified, and an automatic paper selecting capability (hereinafter referred to as "APS") for automatically selecting a paper feeder containing sheets of copy paper having a size computed at the time a document size and a copying magnification are specified. Any copying operation can be carried out in the AMS and APS modes in each of the three copying modes described above.

Switches SW1–SW4, SW6–SW9, SW11–SW14 comprise microswitches associated respectively with the paper feeders 1, 2, 3 for detecting the sizes of sheets of copy paper in the cassettes 4, 5 and on the support 6 and also for detecting whether the sheets are placed lengthwise or widthwise in the paper feeding direction. Sizes to which images can be copied, that is, copy paper sizes which can be set in each of the paper feeders 1, 2, 3 include "A3", "A4", "A5", "A6", "B4", "B5", "B6". For the sizes of "A4", "A5", "B5", the lengthwise or widthwise feeding direction can be selected. The switches SW1–SW4, SW6–SW9 also detect attachment and detachment of the cassettes 4, 5 and hence indirectly the presence or absence of copy paper in the paper feeders 1, 2. The size of copying paper and the direction in which it is set in each of the paper feeders 1, 2, 3 are detected as a 4-bit code corresponding to a combination of "ON" and "OFF" of the switches SW1–SW4, SW6–SW9, SW11–SW14. The detected 4-bit code is stored in a RAM in a first CPU 301, described later on. For one example, the codes produced by the switches SW1–SW4 are given in the following table 1: In the table 1, the "ON" state of the switches is indicated by "0" and the "OFF" state of the switches is indicated by "1". When all of the switches are in the "OFF" state, the cassette 5 is not loaded in the paper feeder 1, i.e., the absence of copy paper is detected.

TABLE 1

| SW4 | SW3 | SW2 | SW1 | Copy paper size | No. |
|---|---|---|---|---|---|
| 0 | 0 | 0 | 0 | | 0 |
| 0 | 0 | 0 | 1 | A6 lengthwise | 1 |
| 0 | 0 | 1 | 0 | B6 lengthwise | 2 |
| 0 | 0 | 1 | 1 | A5 lengthwise | 3 |
| 0 | 1 | 0 | 0 | B5 lengthwise | 4 |
| 0 | 1 | 0 | 1 | A4 lengthwise | 5 |
| 0 | 1 | 1 | 0 | B4 lengthwise | 6 |
| 0 | 1 | 1 | 1 | A3 lengthwise | 7 |
| 1 | 0 | 0 | 0 | A6 widthwise | 8 |
| 1 | 0 | 0 | 1 | B6 widthwise | 9 |
| 1 | 0 | 1 | 0 | A5 widthwise | 10 |
| 1 | 0 | 1 | 1 | B5 widthwise | 11 |
| 1 | 1 | 0 | 0 | A4 widthwise | 12 |
| 1 | 1 | 0 | 1 | B4 widthwise | 13 |

TABLE 1-continued

| SW4 | SW3 | SW2 | SW1 | Copy paper size | No. |
|---|---|---|---|---|---|
| 1 | 1 | 1 | 0 | A3 widthwise | 14 |
| 1 | 1 | 1 | 1 | No cassette | 15 |

Mircroswitches SW5, SW10 at the paper feeders 1, 2 serve to directly detect whether there is copy paper in each of the cassettes 4, 5. A photoelectric switch SW15 mounted on the paper support 6 of the paper feeder 3 also directly detects whether there is copy paper on the paper support 6. The paper feeder 3 is also associated with a microswitch SW24 for detecting an uppermost sheet of copy paper to control the rate of elevation of the paper support 6.

The DF 100 is detachably mounted on the top of the copying device 50. As described later on, when it is detected that the DF 100 and the copying device 50 are electrically connected and the DF 100 is placed in position, the DF 100 and the copying device 50 are controlled in a related manner. When a document is inserted in the DF 100, a copy starting mode of the copying device 50 is changed from a manual starting mode in which a copying cycle is started by turning on a print key SW16 to a DF starting mode in which a copying cycle is started by a start signal issued from the DF 100. In the DF starting mode, the insertion of a document into the DF 100 enables the DF 100 to start operating while the copying device 50 is in a standby condition. The DF 100 feeds the inserted document along the upper surface of the transparent document support 39 and then stops the document in a prescribed position. Thereafter, the DF 100 issues a start signal to the copying device 50 which initiates the copying cycle as described above. When the final scanning of the document is over, the copying device 50 issues a document discharging signal to the DF 100 which discharges the document onto a discharge tray 109.

Operation of the DF 100 will be described in greater detail. When the document inserted between a pair of pinch rollers 106, 111 is detected by a first sensor SEN1, the pinch rollers 106, 111 are pressed against each other and a belt 107 is driven. Slightly thereafter, the pinch rollers 106, 111 are driven and a gate stopper 112 is opened to feed the document. The document is moved by the belt 107 along the upper surface of the document support 39. The document is stopped at a given period of time (set by a timer) after the trailing edge thereof has moved past a fourth sensor SW4 (see FIG. 4). Then, the belt 107 is driven in a reverse direction until the trailing edge of the document engages a stopper 113, whereupon the belt 107 is stopped and a document feeding operation is completed.

When the document is stopped on the document support 39, the DF 100 issues a signal to the copying device 50 to start a copying cycle. Upon completion of the scanning movement of the scanning optical system 40 in the copying cycle, the copying device 50 issues a signal to the DF 100 to drive the belt 107 again for discharging the document on the document support 39. If the copying device 50 is in a multicopying mode, then the document will not be discharged until the scanning movement for a final copy is finished.

Figure 2:
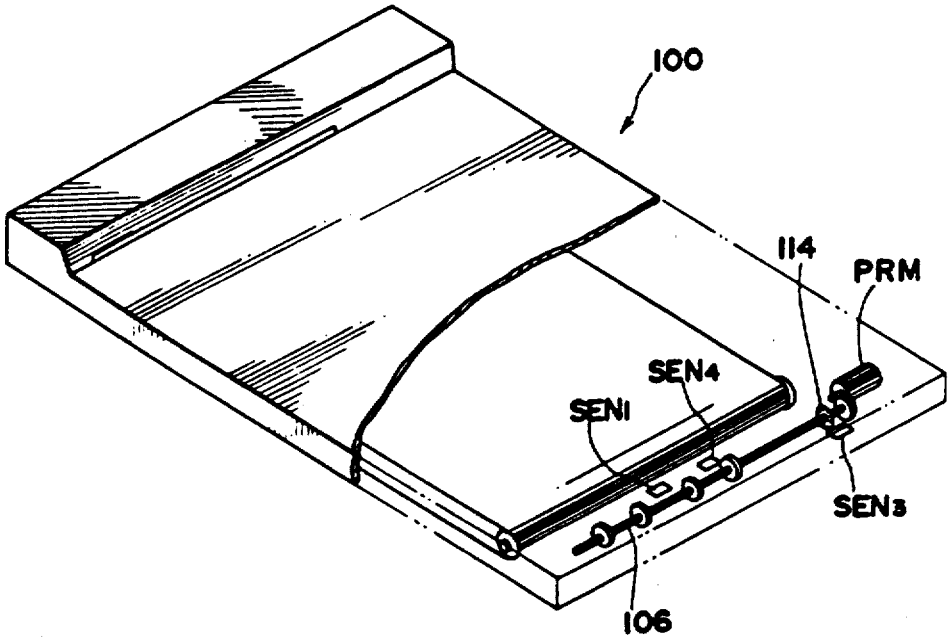
FIG. 2 is a perspective view of a means for detecting the size of a document in the document feeder.
Figure 3:
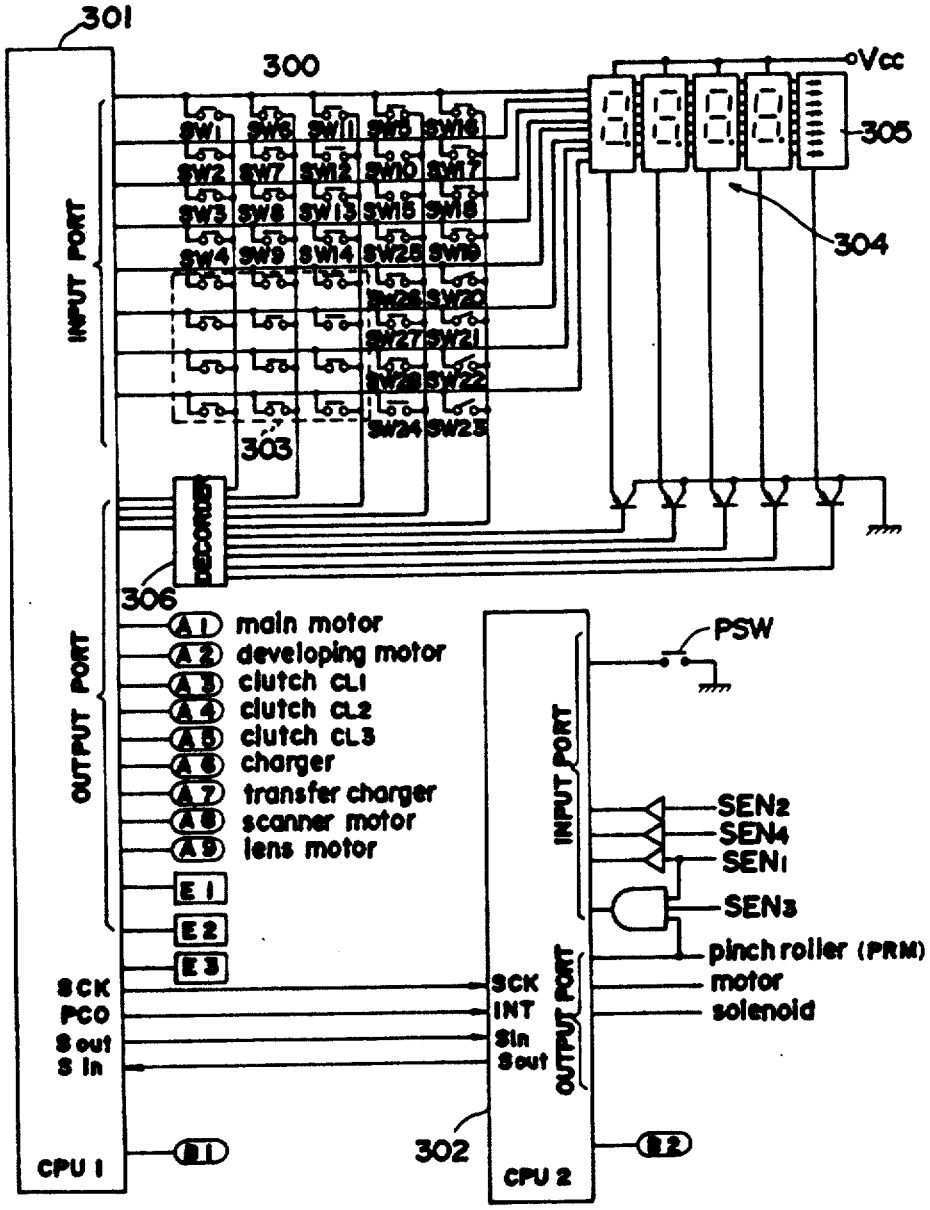
FIG. 3 is a circuit diagram showing a computer for controlling the copying device and the document feeder and inputs and outputs of the computer.

FIG. 2 shows an arrangement for detecting the size of a document to be copied. The inserted document is fed by the pinch rollers 106, 111 onto the document support 39. At this time, the length of the document is measured by applying pulse signals generated by a pulse disk 114 and a sensor SEN3 to a second CPU 302. More specifically, as shown in FIG. 3, an output signal from the sensor SEN3, an output signal from the sensor SEN1 which detects the document moving therepast, and an output signal for driving the pinch rollers 106, 111 are ANDed and applied to the second CPU 302 which counts pulses while the document is passing the sensor SEN1 to generate a signal indicating the length of the document A sensor SEN4 serves to classify the widthwise length of the document. If the A4 or B5 document is fed widthwise, the sensor SEN4 is turned on, and if the A4 or B5 document is fed lengthwise, the sensor SEN4 is turned off. Therefore, the sensor SEN4 can identifies the sizes of the A4, A5, B5, B6 documents which could not be determined simply by the length signal. The size of the document and the condition in which the document is set, i.e., whether it is fed lengthwise or widthwise, are discriminated by the above arrangement, and the results are encoded by the second CPU 302 into a copy paper size code, given above, which is transmitted to the first CPU 301.

The first CPU 301 which receives the document size code from the second CPU 302 uses the copy paper size codes stored in the RAM therein and the received document size code for activating The AMS mode for automatically setting an optimum copying magnification when copy paper and document sizes are specified and the APS mode for automatically selecting a paper feeder containing copy paper of an optimum size when a document size and a copying magnification are specified.

The AMS mode is set by the depression of an AMS mode key SW18. When a document is inserted into the DF 100 in the AMS mode, the second CPU 302 discriminates the document size and isses a corresponding code to the first CPU 301. The first CPU 301 is responsive to the document size signal from the DF 100 and the size code of copy paper contained in the paper feeder selected by the operator for computing an optimum copying magnification. If the computed copying magnification meets the specifications of the copying device 50, then the first CPU 301 sets the copying device 50 to the copying magnification, and if not, the first CPU 301 indicates to the operator by a suitable means that there is no optimum copying magnification, making the operator manually set a copying magnification. The document sizes, the copy paper sizes, and the copying magnifications computed and set thereby are set forth in the table 2. In the table 2, if a copy paper size is "A5 widthwise" and a document size is "A4 widthwise", then an optimum copying magnification is computed as "0.707", which is set. If a copy paper size is "B6 lengthwise" and a document size is "A3 lengthwise", then there is no optimum copying magnification, and the operator is required to manually set a copying magnification.

TABLE 2

| Document size | Copy paper size selected by operator | | | | | | | | | |
|---|---|---|---|---|---|---|---|---|---|---|
| | A6 (L) | B6 (L) | A5 (L) | A5 (W) | B5 (L) | B5 (W) | A4 (L) | A4 (W) | B4 (L) | A3 (L) |
| A5 (L) | 0.707 | 0.866 | 1.000 | 0.707 | 1.225 | 0.866 | 1.414 | 1.000 | 1.420 | 1.420 |
| A5 (W) | manual | manual | 0.707 | 1.000 | 0.866 | 1.225 | 1.000 | 1.414 | 1.225 | 1.414 |
| B5 (L) | manual | 0.707 | 0.816 | manual | 1.000 | 0.707 | 1.154 | 0.816 | 1.414 | 1.420 |
| B5 (W) | manual | manual | manual | 0.816 | 0.707 | 1.000 | 0.816 | 1.154 | 1.000 | 1.154 |
| A4 (L) | manual | manual | 0.707 | manual | 0.866 | manual | 1.000 | 0.707 | 1.225 | 1.414 |
| A4 (W) | manual | manual | manual | 0.707 | manual | 0.866 | 0.707 | 1.000 | 0.866 | 1.000 |
| B4 (L) | manual | manual | manual | manual | 0.707 | manual | 0.816 | manual | 1.000 | 1.154 |
| A3 (L) | manual | manual | manual | manual | manual | manual | 0.707 | manual | 0.866 | 1.000 |

The APS mode is set by the depression of an APS mode key SW19. When a document is inserted into the DF 100 in the APS mode, the second CPU 302 discriminates the document size and issues a corresponding code to the first CPU 301. The first CPU 301 is responsive to the document size signal from the DF 100 and a copying magnification signal applied by the operator for computing an optimum copy paper size and selecting a paper feeder in which copy paper of the computed size is contained. If there is no copy paper of the computed size is contained in the paper feeder or the computed copy paper size does not meet the specifications of the copying device 50, then the first CPU 301 indicates to the operator by a suitable means that there is no copy paper of optimum size, making the operator set a cassette of optimum-size copy paper, or manually select a paper feeder, or manually set a copying magnification. The document sizes, the copying magnifications, and the copy paper sizes computed and set thereby in this APS mode are set forth in the table 3. In the table 3, if a document size is "B5 widthwise" and the a copying magnification is "0.789", then an optimum copy paper size is computed as "A5 widthwise" and a paper feeder containing copy paper of the "A5 widthwise" is selected. If a document size is "A3 lengthwise" and an optimum copying magnification is "1.420", then there is no optimum copy paper size, and the operator is required to manually select a paper feeder.

TABLE 3

| Document size | Copying magnification set by operator | | | | | | |
|---|---|---|---|---|---|---|---|
| | 0.640~ 0.711 | 0.712~ 0.823 | 0.824~ 0.871 | 0.872~ 1.007 | 1.008~ 1.159 | 1.160~ 1.231 | 1.232~ 1.420 |
| A5 (L) | A6 (L) | B6 (L) | B6 (L) | A5 (L) | B5 (L) | B5 (L) | A4 (L) |
| A5 (W) | A5 (W) | A5 (W) | A5 (W) | A5 (W) | B5 (W) | B5 (W) | A4 (W) |
| B5 (L) | B6 (L) | A5 (L) | B5 (L) | B5 (L) | A4 (L) | B4 (L) | B4 (L) |
| B5 (W) | A5 (W) | A5 (W) | B5 (W) | B5 (W) | A4 (W) | manual | manual |
| A4 (L) | A5 (L) | B5 (L) | B5 (L) | A4 (L) | B4 (L) | B4 (L) | A3 (L) |
| A4 (W) | A5 (W) | B5 (W) | B5 (W) | A4 (W) | manual | manual | manual |
| B4 (L) | B4 (L) | A4 (L) | B4 (L) | B4 (L) | A3 (L) | manual | manual |
| A3 (L) | A4 (L) | B4 (L) | B4 (L) | A3 (L) | manual | manual | manual |

The copying device 50 and the DF 100 which are of the foregoing construction are controlled in operation by the first and second CPUs 301, 302 which operate in a related fashion.

The first CPU 301 is connected through a decoder 306 to a key matrix 300 including ten-key switches 303, the print key SW 16, the mode switching key SW17, the AMS mode key SW18, the APS mode key SW19, and the other switches SW1–SW15, a display unit 304 for displaying the number of copies to be made in response to depression of the ten-key switches 303, and light-emitting diodes 305 for producing various indications, the key matrix 300, the display unit 304, and the light-emitting diodes 305 being disposed on a control panel, not shown, of the copying device 50. The first CPU 301 has output ports connected to driver circuits (not shown) for a main motor, a motor for driving the developing unit, clutches, a motor for moving the lens, a motor for driving the optical system, and the chargers. The first CPU 301 also has output ports connected to a display unit E1 for indicating the absence of optimum-size copy paper at the time copy paper is automatically selected, a display unit E2 for indicating the absence of any optimum copying magnification when a copying magnification is automatically selected, and a display unit E3 for indicating that a second document is placed in a manner different from that in which a first document is placed in the duplex copying mode. The first CPU 301 is connected through an interrupt signal output port PCO, data input and output terminals Sin, Sout, and data sampling and output clock terminals SCK to the second CPU 302 which controls the operation of the DF 100.

The second CPU 302 has input ports connected to a switch PSW for detecting operation of the DF 100, and the first through fourth sensors SEN1–SEN4 and output ports connected to a driver circuit (not shown) for driving the pinch rollers 106, 111 and a driver circuit (not shown) for a solenoid for pressing the pinch rollers 106, 111 against each other.

The first and second CPUs 301, 302 have terminals B1, B2, respectively, receptive of motor pulse signals generated in synchronism with rotation of the main motor (not shown) in the copying device 50 and rotation of a motor (not shown) for driving the belt 107 in the DF 100. The pulse signals thus applied to the terminals B1, B2 serve to synchronize the control by the CPUs with the mechanical operation of the copying device 50 and the DF 100.

The first and second CPUs 301, 302 thus related to the copying device 50 and the DF 100 transmit and receive signals to and from each other in executing the processes illustrated in FIGS. 4, 5, 6, and 7.

Figure 4:
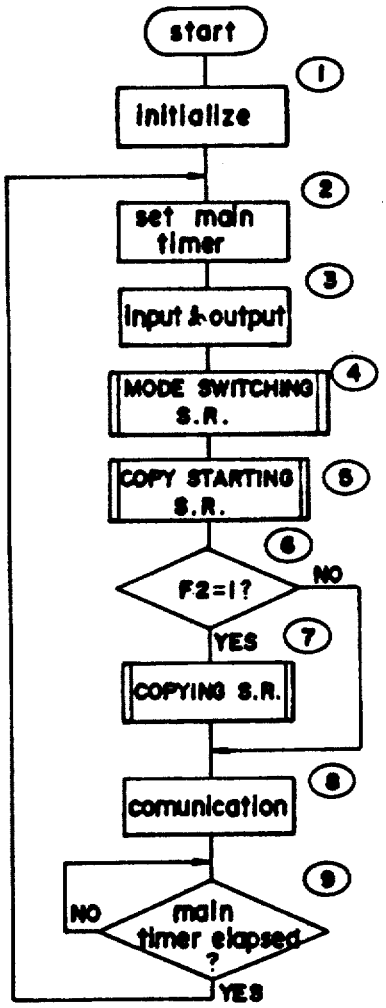
FIG. 4 is a flowchart of a control process to be executed by the computer for controlling the copying machine.

FIG. 4 is a flowchart of an overall process executed by the first CPU 301. A step 1 initializes, or sets to "0", flags such for example as a duplex flag $F_0$ indicating that the copying device 50 is in the duplex or normal copying mode, a face flag $F_1$ indicating the face or back copying mode in the duplex copying mode, and a copy starting flag $F_2$ indicating the start of a copying cycle.

In a step 2, a timer (main timer) is set for determining the length of one routine. This timer may be an internal timer in the first CPU 3011 or an external timer.

In a step 3, the first CPU 301 processes input signals from the ten-key switches and external switches, issues signals to the motors, solenoid, and display units, and stores the data on the sizes of copy paper sheets contained in the paper feeders 1, 2, 3 into the internal RAM.

A step 4 switches the operation mode of the copying device 50 to the duplex copying mode or the normal copying mode. In this step 4, the first CPU 301 discriminates the condition of the copying device 50 at the time the mode switching key SW 17 is switched. If the copying devices 50 is in the face copying mode in the duplex copying mode, then the first CPU 301 switches the copying device mode to the normal copying mode. If the copying device 50 is in the normal copying mode, then the first CPU 301 switches the copying device mode to the duplex copying mode. While the copying device 50 is in a copying cycle, no signal from the mode switching key SW17 is accepted. The step 4 will be described in greater detail with reference to FIG. 5.

In a step 5, the first CPU 301 sets the copy starting flag $F_2$ to "1" for starting a copying device operation in response to a start signal. If the copying device is in the AMS mode, then an optimum copying magnification is computed and set in this step. If the copying device is in the APS mode, then an optimum copy paper size is computed and set. The step 6 will be described later in detail.

A step 6 discriminates the copy starting mode $F_2$. If the flag $F_2$ is "1", then the program goes to a step 7, and of "0", then the program goes to a step 8, skipping the step 7.

The step 7 executes a copying operation dependent on the copying mode.

In the step 8, data is transmitted to and received from the DF 100. Such data transmission and reception is processed upon an interrupt by the first CPU 801.

A step 9 ascertains whether the time set by the timer in the step 2 has elapsed or not. If the time has elapsed, then the program returns to the step 2. The step 9 therefore serves to keep the length of one routine constant.

Figure 5:
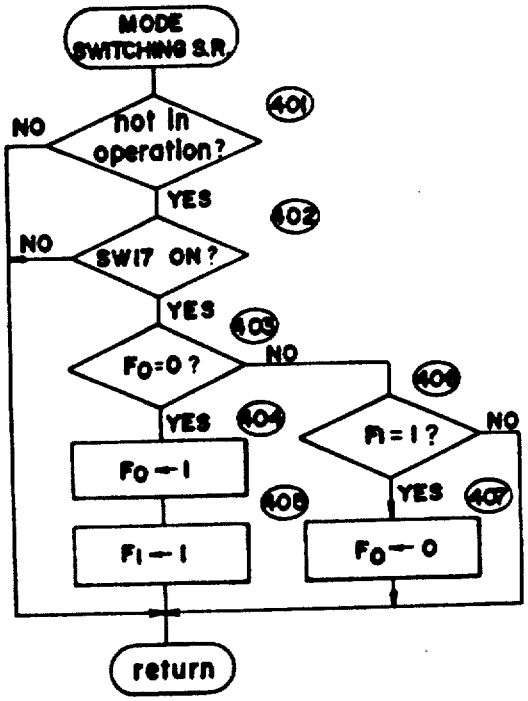
FIG. 5 is a flowchart of a mode switching subroutine.

The mode switching subroutine of the step 4 will be described with reference to FIG. 5. A step 401 ascertains whether the copying device 50 or the DF 100 is in operation. If in operation, then the program returns to the main routine without executing various steps, described below, and if not in operation, then the program proceeds to a step 402. During a copying operation, therefore, a signal from the mode switching key SW17 is not accepted.

Steps 402 through 405 serve to switch from the normal copying mode to the duplex copying mode. If the mode switching key SW17 is "ON" in the step 402 and the duplex copying mode flag $F_0$ is "0" in the step 403, then the flag $F_0$ is set to "1" for indicating the duplex copying mode in the step 404, and the flag $F_1$ is set to "1" for indicating the face copying mode in the duplex copying mode in the step 405.

The step 403 and steps 406, 407 serve to switch from the duplex copying mode to the normal copying mode. If the mode switching key SW17 is "ON" in the step 402, if the copying flag $F_0$ is "1" in the step 403, and if the face flag $F_1$ is "1" in the step 406, then the copying mode flag $F_0$ is set to "0" in the step 407. Therefore, these steps switch the mode to the normal copying mode if the "ON" state of mode switching key SW17 is detected when the copying device is in the duplex copying mode, but not in the back copying mode. Accordingly, when the copying device is in the duplex copying mode and also in the back copying mode, that is, when there a sheet of copy paper with an image copied on its face is contained in the re-feeding tray 64, no mode switching is carried out to thereby prevent any copy paper sheet from being left in the intermediate tray 64.

Figure 6:
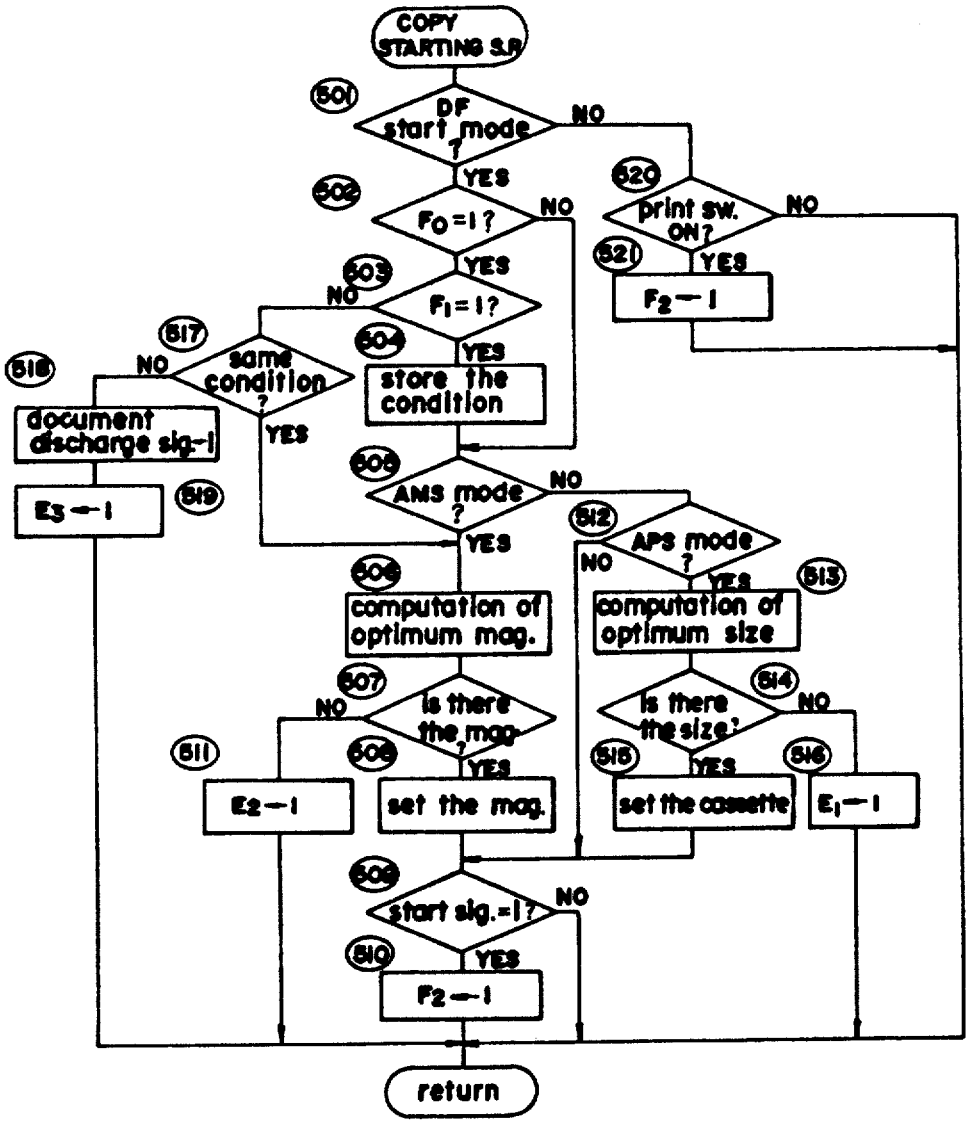
FIG. 6 is a flowchart of a copy starting subroutine.

FIG. 6 is a flowchart of the copy starting subroutine of the step 5 shown in FIG. 4. A step 501 determines whether the DF 100 is in a DF starting mode in which a document inserted in the DF 100 is detected to start a copying operation. If in the DF starting mode, then the program goes to a step 502 which discriminates the duplex copying flag $F_0$. If the duplex flag $F_0$ is "1" or the copying device 50 is in the duplex copying mode, then the program proceeds to a step 503 to discriminate the face flag $F_1$. If the face flag $F_1$ is "1" or the copying device 50 is in the face copying mode, then a step 504 stores data on the condition in which a first document is placed, lengthwise or widthwise, on the document support, into the RAM in the first CPU 301. Then the program proceeds to a step 505 to determine whether the copying device is in the AMS mode or not. If in the AMS mode, then the program goes to a step 506 in which an optimum copying magnification is computed based on a copy size paper signal and a document size signal transmitted from the second CPU 302 for the DF 100. If the copying device 50 is determined as being in the normal copying mode in the step 502, then the program directly goes to the step 505.

A step 507 ascertains whether the optimum copying magnification computed in the step 506 meets the specifications of the copying device 50. If the computed optimum copying magnification meets the specifications, then the optimum copying magnification is set, and if not, then the program proceeds to a step 511 which indicates to the operator through the display unit E2 that there is no optimum copying magnification. A step 509 discriminates a copy starting signal from the DF 100. If the copy starting signal is "1", then the program goes to a step 510 in which the copy starting flag $F_2$ is set to "1", and then the program returns to the main routine If not in the AMS mode in the step 505, then the program branches to a step 512 which determines the copying device 50 is in the APS mode. If in the APS mode, then the program proceeds to a step 513 which computes an optimum copy paper size based on a copying magnification set by the operator and a document size signal transmitted from the second CPU 302 to determine if copy paper of a size coinciding with the computed optimum copy paper size is set in any of the paper feeders. If such copy paper is set in a paper feeder, then that paper feeder is selected in a step 515, from which the program goes to the step 509. If no copy paper of a size coinciding with the computed optimum copy paper size is set in any paper feeder, then the program goes to a step 516 which indicates to the operator through the display unit E1 that there is no copy paper of the optimum size set in any paper feeder.

If the copying device 50 is determined as being in the back copying mode in the duplex copying mode in the step 503 then the program goes to a step 517. The step 517 determines if the condition in which a second document to be copied on the back of the copy paper is placed is equal to the condition in which the first document is placed, the latter condition being stored in the RAM in the step 504. If they are equal, then the program goes to the step 506, and if they are not, then a step 518 sets a signal to discharge the second document from the document support 39, and a step 519 energizes the display unit or lamp E3 to indicate that the condition in which the second document is placed is different from the condition in which the first document is placed. Then, the program returns to the main routine.

In the duplex copying mode, if the direction in which the second document is to be fed is inappropriate, then no copying operation is effected, and the operator is notified of such an inappropriate condition. If the direction in which the second document is to be fed is appropriate, then the copying device automatically goes to the AMS mode which computes an optimum magnification for copying the second document on the back of the copy paper with an image of the first document being carried on the face thereof, and then copies an image of the second document at the computed magnification. If the optimum copying magnification does not meet the specifications of the copying machine 50, then no copying operation is performed and the operator is notified of this condition. This control of the present invention is effective in avoiding various copying failures.

If the DF 100 is not in the DF starting mode, or is in a manual starting mode in the step 501, the program proceeds to a step 520 for discriminating the operation of the print key SW16. If the print key SW16 is operated, then the program goes to a step 521 in which the copy starting flag $F_2$ is set to "1", and then the program returns to the main routine.

Figure 7:
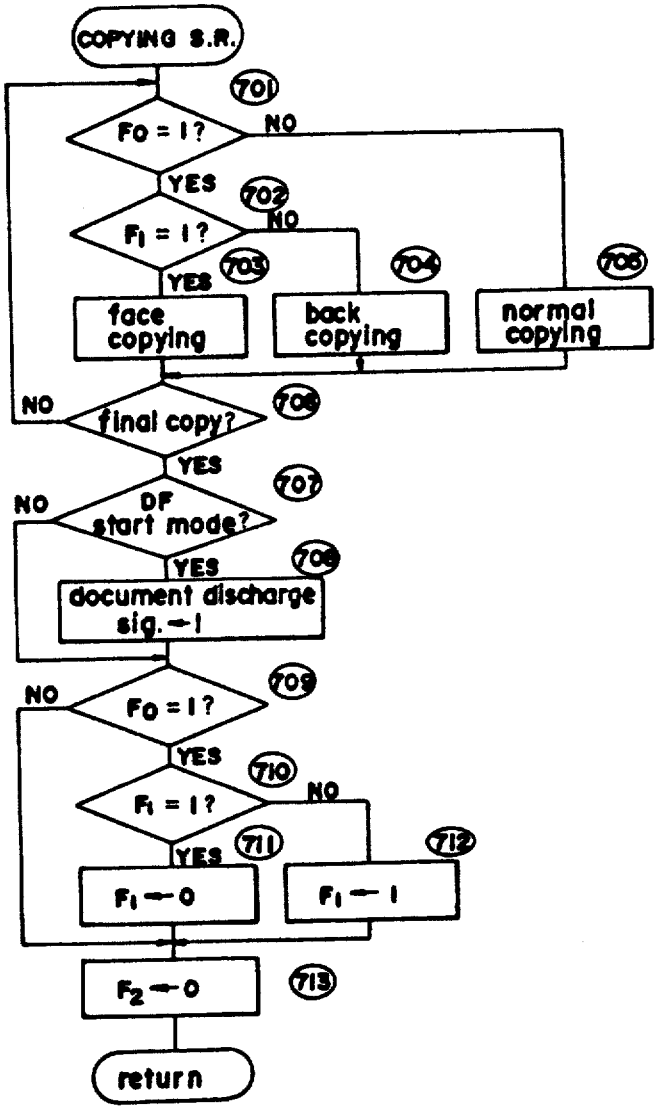
FIG. 7 is a flowchart of a copy processing subroutine.

FIG. 7 is a flowchart of the copying subroutine of the step 7 shown in FIG. 4. A step 701 discriminates the copying mode flag $F_0$. If the copying mode flag $F_0$ is "1", the program goes to a step 702 which discriminates the face flag $F_1$. If the face flag $F_1$ is "1", then the program goes to a step 702 to execute a face copying operation. If the face flag $F_1$ is "0" in the step 702, the program proceeds to a step 704 which effects a back copying operation. If the copying mode flag $F_0$ is "0" in the step 701, then the program goes to a step 705 which effects a normal copying operation.

A step 706 ascertains whether the copying operation effected in each of the steps 703 through 705 is to produce a final copy. If not a final copy, the program goes back to the step 701 to repeat a copying operation. If a final copy has been completed, then the program goes to a step 707 which determines whether the DF is in the DF starting mode. If in the DF starting mode, then a step 708 sets a document discharging signal to "1", and then the program goes to a step 709. If in the manual starting mode in the step 707, then the program goes directly to the step 709. The document discharging signal is transmitted to the second CPU 302 for the DF 100. In response to the document discharging signal, the DF 100 discharges the document onto the discharge tray 109.

The steps 709 through 713 serve to process the flags after the copying operation has been completed. The step 709 discriminates the duplex copying flag $F_0$. If the duplex copying flag $F_0$ is "1", then the program goes to the step 710 which discriminates the face flag $F_1$. If face flag $F_1$ is "1", the face flag $F_1$ is set to "0" in the step 711. If face flag $F_1$ is "0", the face flag $F_1$ is set to "1" in the step 712. Then the program goes to the step 713. If the copying mode flag $F_0$ is "0" in the step 709, then the program goes from the step 709 directly to the step 713. The step 713 sets the copy starting flag $F_2$ to "0", and then the program returns to the main program.

The copying apparatus of the illustrated embodiment is automatically brought into the AMS mode when copying an image on the back of the copy paper while using the DF 100. Even if the second document is of a size different from that of the first document, therefore, an optimum copying magnification such that the image can properly be contained in the frame of the copy paper with an image already copied on the face thereof is automatically selected, and a copying operation is effected at such a copying magnification. When the condition in which the second document is placed is different from that in which the first document is placed, no image is copied on the back of the copy paper, and the second document is discharged and the display lamp E3 is energized to indicate to the operator that the second document should be placed in a different condition. The second document is copied on the back of the copy paper only when the condition in which the second document is placed is the same as that in which the first document is placed.

The present invention is not limited to the foregoing embodiment, but may be modified in various ways. For example, the size of a document or the condition in which it is placed on the transparent document support can be discriminated by a reflecting-type sensor mounted in the copying device. With this modification, the present invention can be reduced to practice without employing the DF 100. Automatic setting of a copying magnification at the time of copying a second document on the back of copy paper may not be directly followed by an automatic copying operation, but may be followed by letting the operator know the varied copying magnification and then depressing the print key for starting a copying operation. Alternatively, the operator may simply be notified of an inappropriate copy magnification. Where a second document to be copied is placed improperly, the document may not immediately be discharged automatically by the DF 100, but a display may first be given to indicate such a condition, and then the document may be copied on the back of the copy paper if the print key is turned on, or the document may forcibly be discharged if the print key is not turned on within a certain period of time. The duplex copying mechanism may be of the type which copies an image on the faces of a successive number of copy sheets and then copies another image successively on the backs of the copy sheets, or of the type which copies images on the face and back of a copy sheet each time it is fed through the copying device.

What is claimed is:

1. A copying apparatus having a duplex copying capability for copying an image of a first document on the front face of a copy paper and an image of a second document on the rear face of the copy paper, the apparatus comprising;

means for storing the size or orientation of the first document or the copy paper;

means for detecting the size or orientation of the second document;

means for discriminating whether a copying condition is proper so that the image of the second document is contained within the frame of the rear face of the copy paper by comparing the stored size or orientation and the detected size or orientation, and control means for inhibiting the copying operation when the discriminated condition is improper in response to the discriminating means.

2. A copying apparatus as claimed in claimed 1, further comprising a display means for indicating the improper condition in response to the discriminating means.

3. A copying apparatus as claimed in claim 1, further comprising a transparent document support and a document feeding device for feeding the document to and from the transparent document support, and wherein said control means further controls the document feeding device so as to discharge the second document in case the discriminated condition is improper.

4. A copying apparatus as claimed in claim 3, wherein said detecting means is disposed in the document feeding device.

5. A copying apparatus having a duplex copying capability for copying an image of a first document on the front face of a copy paper and an image of a second document on the rear face of the copy paper, and a magnification varying capability between a predetermined magnification range, the apparatus comprising:

means for storing the size of the first document or the copy paper;

means for detecting the size of the second document;

means for computing an optimum magnification from the stored size and the detected size;

means for discriminating whether the computed magnification is proper in comparison with the predetermined magnification range of the copying apparatus; and control means, responsive to the discriminating means, for inhibiting the copying operation in the case that the computed magnification is improper and for allowing the copying operation to start after automatically setting the computed magnification in that case where the computed magnification is proper.

6. A copying apparatus as claimed in claim 5, further comprising a display means for indicating the improper condition in response with the discriminating means.

7. A copying apparatus as claimed in claim 5, further comprising a document feeding device for feeding the document to and from a transparent document support, and wherein said control means further controls the document feeding device so as to discharge the second document in the case that the discriminated condition is improper.

8. A copying apparatus as claimed in claim 7, wherein said detecting means is disposed in the document feeding device.

9. A copying apparatus having a duplex copying capability for copying an image of a first document on the front face of a copy paper and an image of a second document on the rear face of the copy paper, the apparatus comprising;

means for storing the orientation of the first document or the copy paper;

means for detecting the orientation of the second documents;

means for discriminating whether the stored orientation is the same as the detected orientation; and control means for inhibiting the copying operation in the case that both orientations are different from each other.

10. A copying apparatus as claimed in claim 9, further comprising a display means for indicating the improper condition in response with the discriminating means.

11. A copying apparatus as claimed in claim 9, further comprising a document feeding device for feeding the document to and from a transparent document support, and wherein said control means further controls the document feeding device so as to discharge the second document when the discriminated condition is improper.

12. A copying apparatus as claimed in claim 11, wherein said detecting means is disposed in the document feeding device.

13. A copying apparatus having a duplex copying capability for copying an image of a first document on the front face of a copy paper and an image of a second document on the rear face of the copy paper, the apparatus comprising:

means for storing the size or orientation of the first document or the copy paper;

means for detecting the size or orientation of the second document;

means for discriminating whether the image of the second document is within the frame of the rear face of the copy paper by comparing the stored size or orientation and the detected size or orientation; and means for suspending the copying operation for the second document when a mis-match between the size or orientation of the copy paper and that of the second document is discriminated by the discriminating means.

14. A copying apparatus as claimed in claim 13, further comprising a display means for indicating the mismatch condition between the first and second documents.

15. A copying apparatus as claimed in claim 13, wherein the second control means further discharges the second document after the suspension of the copying operation.

16. A copying apparatus having a duplex copying capability for copying an image of a first document on the front face of a copy paper and an image of a second document on the rear face of the copy paper and a document handling capability for feeding the documents to and from a transparent document support, the apparatus comprising:

means for detecting the size or orientation of the documents;

first control means for controlling the copying operation for the first and second documents so as to automatically perform those copying operations in succession;

means for discriminating whether the size or orientation of the second document matches with that of that first document according to the detecting means; and second control means for suspending, irrespective of the control of the first control means, the copying operation for the second document when the size or orientation of the second document does not match with that of the first document.

17. A copying apparatus as claimed in claim 16, further comprising a display means for indicating the mismatch condition between the first and second documents.

18. A copying apparatus as claimed in claim 16, wherein the second control means discharges the second document after the suspension of the copying operation.

19. A copying apparatus having a document handling capability for feeding the documents to and from a transparent document support, the apparatus comprising:

means for detecting the size or orientation of first and second documents;

first control means for controlling the copying operation for the first and second documents so as to automatically perform those copying operations in succession; and second control means for suspending, irrespective of the control of the first control means, the copying operation for the second document when the size or orientation of the second document does not match with that of the first document.

20. A copying apparatus as claimed in claim 19, further comprising a display means for indicating a mismatch condition between the first and second documents.

21. A copying apparatus as claimed in claim 19, wherein the second control means discharges the second document after the suspension of the copying operation.

22. A copying machine having a duplex copying capability for copying a first image on one side of a copy paper and a second image on the other side of the copy paper, comprising:

means for storing the size of the copy paper;

means for detecting the size of the second image;

means for comparing the size of the copy paper with the size of the second image; and control means for inhibiting a copying operation when the means for comparing indicates an improper reproduction of the second image relative to the size of the copy paper.

23. A copying machine having a duplex copying capability for copying a first image on one side of a copy paper and a second image on the other side of the copy paper, comprising:

means for storing the orientation of the copy paper, relative to the copying machine;

means for detecting the orientation of the second image;

means for comparing the orientation of the copy paper with the orientation of the second image; and control means for inhibiting a copy operation when the means for comparing indicates an improper reproduction of the second image relative to the orientation of the copy paper.

24. A copying apparatus having a duplex copying capability for copying an image of a first document on the front face of a copy paper and an image of a second document on the rear face of the copy paper, and a magnification varying capability between a predetermined magnification range, the apparatus comprising:

means for storing the size of the first document or the copy paper;

means for detecting the size of the second document;

means for computing an optimum magnification from the stored size and detected size;

means for discriminating whether the computed magnification is proper in comparison with the predetermined magnification range of the copying apparatus; and control means, responsive to the discriminating means, for allowing the copying operation to start after automatically setting the computer magnification in the case that the computer magnification is proper.

25. A copying apparatus a claimed in claim 1, further comprising a second control means, responsive to the discriminating means, for inhibiting the copying operation in the case that the computed magnification is improper.

26. A copying apparatus as claimed in claim 25, further comprising a display means for indicating the improper condition in response with the discriminating means.

27. A copying apparatus as claimed in claim 25, further comprising a document feeding device for feeding the document to and from a transparent document support, and wherein said control means further controls the document feeding device so as to discharge the second document in the case that the discriminated conditions is improper.

28. A copying apparatus as claimed in claim 27, wherein said detecting means is disposed in the document feeding device.

29. A copying apparatus as claimed in claim 24, further comprising a second control means, responsive to the discriminating means, for suspending the copying operation in the case that the computed magnification is improper.

30. A copying apparatus as claimed in claim 29, further comprising a display means for indicating the improper condition in response with the discriminating means.

31. A copying apparatus as claimed in claim 29, further comprising a document feeding device for feeding the document to and from a transparent document support, and wherein said control means further controls the document feeding device so as to discharge the second document in the case that the discriminated condition is improper.

32. A copying apparatus as claimed in claim 31, wherein said detecting means is disposed in the document feeding device.

*33. An image forming apparatus comprising:*

*means for forming images onto one sheet a plurality of times;*

*automatic sheet selecting means for selecting the sheet of the proper size on the basis of a size of image and an image forming magnification;*

*automatic magnification selecting means for selecting the proper image forming magnification on the basis of the size of image and the size of sheet; and*

*control means for making said automatic sheet selecting means operative when the first image forming operation is performed by said image forming means and for making said automatic magnification selecting means operative when the second image forming operation is performed.*

*34. An image forming apparatus according to claim 33 wherein said image forming means includes means for forming images onto the second side of said sheet after the images were formed onto the first side of the sheet.*

*35. An image forming apparatus comprising:*

*image forming means for forming a plurality of images onto one sheet of copy paper;*

*automatic paper selecting means for selecting a proper copy paper size on the basis of the size of an original and an image forming magnification;*

*automatic magnification selecting means for selecting a proper image forming magnification on the basis of the size of an original and the size of copy paper, and*

*control means for making said automatic paper selecting means operative when a first image forming operation is performed by said image forming means and for making said automatic magnification selecting means operative when a second image forming operation is performed.*

*36. An image forming apparatus comprising:*

*image forming means for forming a first and a second image from first and second original pages, respectively, onto one sheet of copy paper;*

*feeding means for consecutively feeding said original pages to said image forming means prior to an image forming operation;*

*sensor means for determining an original paper size as the original paper is being fed by said feeding means;*

*a plurality of paper feeders providing different sized copy paper to said image forming means;*

*automatic paper selecting means for selecting a proper copy paper size and a corresponding paper feeder on the basis of the original paper size of the first original page and an image forming magnification;*

*automatic magnification selecting means for selecting a proper image forming magnification on the basis of the original paper size of the second original page and a copy paper size, and*

*control means for making said automatic paper selecting means operative when a first image forming operation is performed by said image forming means with the first original page and for making said automatic magnification selecting means operative when a second image forming operation is performed by said image forming means with the second original page.*

*37. An image forming apparatus comprising:*

*document feeding means for consecutively feeding a first and a second document;*

*sensor means for determining a first and a second document size, respectively, when the first and second documents are fed by said document feeding means;*

*image forming means for forming a first and a second document image of the first and second documents, respectively, onto a copy paper;*

*a plurality of paper feeders for providing one of a plurality of different sized papers as the copy paper;*

*means for selecting a first image forming magnification for forming the first document image onto the copy paper;*

*automatic paper selecting means for selecting a proper paper size and corresponding paper feeder on the basis of the first document size and the first image forming magnification, the image forming means forming the first document image onto the copy paper fed from the selected paper feeder, and*

*automatic magnification selecting means for selecting a second image forming magnification on the basis of the second document size and the copy paper size selected by the automatic paper selecting means, the image forming means forming the second document image onto the copy paper.*

* * * * *